Sept. 18, 1956 F. A. DE GROOT ET AL 2,763,779

CONTROL-CIRCUIT ARRANGEMENT

Original Filed April 8, 1946

FOLKERT ALBERT DE GROOT,
BERNARDUS WILLEM VAN INGEN SCHENAU,
INVENTORS.

BY Lee B. Kemon

ATTORNEY.

United States Patent Office 2,763,779

Patented Sept. 18, 1956

2,763,779

CONTROL-CIRCUIT ARRANGEMENT

Folkert Albert De Groot and Bernardus Willem van Ingen Schenau, Eindhoven, Netherlands Original application April 8, 1946, Serial No. 660,326, now Patent No. 2,556,070, dated June 5, 1951. Divided and this application March 12, 1951, Serial No. 219,392

5 Claims. (Cl. 250—36)

Figures 1, 2, 3, 4, 5, 6:
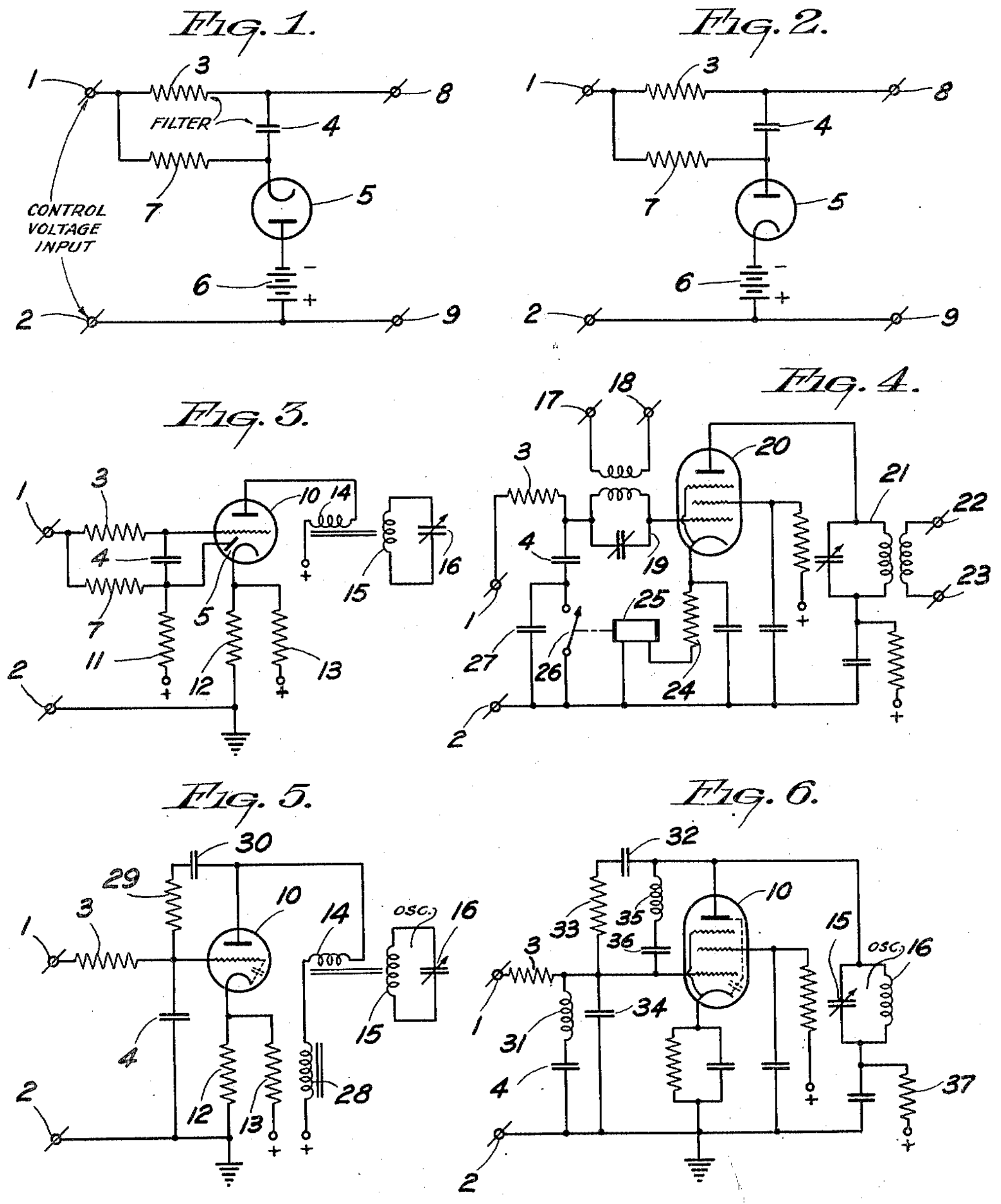

This application is a division of United States application of Folkert A. De Groot et al., Serial No. 660,326, now Patent No. 2,556,070, filed April 8, 1946.

This invention relates to a control-circuit arrangement in which a variable direct voltage (control voltage) is supplied to one or more members to be controlled via a smoothing filter.

Control-circuit arrangements of this kind are frequently utilized amongst others in radio-receivers, for example, for the compensation of fading phenomena, or for the correction of the tuning. In the case of fading compensation (automatic volume control) the control voltage is obtained by rectification of the received signal, the members to be controlled being constituted by one or more signal amplifying tubes, the mutual conductance of which is influenced by the control. In the case of correction of the tuning (automatic frequency control) the control voltage is ordinarily produced by means of a frequency dependent network, which has connected to it two push-pull connected rectifiers, the member to be controlled being constituted by a discharge tube (control tube) of which the mutual conductance and/or the anode current is influenced by the control voltage and which controls the tuning of one or more oscillatory circuits.

It frequently causes certain difficulty in practice to proportion the smoothing filter through which the control voltage is supplied to the members to be controlled. Thus, for example, in the case of automatic volume control it is desirable that the time constant of the smoothing filter should be given a high value with respect to the period of the lowest modulation frequency to be reproduced, since otherwise the lowest modulation frequencies are influenced by the control. On the other hand, however, more particularly in the reception of very distant transmitters, very quickly progressing fading phenomena may occur, which cannot be compensated for when use is made of a smoothing filter with a comparatively great time constant, as above-described.

In the case of automatic frequency control a very great time constant, for example of a few seconds, is as a rule desirable to prevent the receiver with fading of the carrier-wave of the signal to be received from being tuned to a side-band frequency, or even to another signal. On the other hand, this great time constant frequently causes difficulty in the reception of strong signals, during which the control voltage may take very considerable values. In this connection it may be remarked that, as a rule, the control-grid bias of the control tube cannot take high positive values since in this case a grid current occurs, reducing the bias again to a smaller value. A high negative control voltage can, however, lead to such a negative control-grid bias that the control tube is completely blocked and this bias, due to the great time constant, frequently cannot decrease sufficiently quickly on approaching the correct tuning, due to which the operation of the receiver is rendered difficult.

According to the invention, the above-described difficulties are avoided by that the time constant of the smoothing filter is automatically varied as a function of the strength of the control voltage.

For example, in the case of automatic volume control it is then possible to utilize a great time constant in the reception of strong signals (high control voltage) so that distortion of the lowest modulation frequencies is avoided but to utilize a considerably smaller time constant in the reception of weak signals (low control voltage) so that quickly progressing fading phenomena also may be compensated.

In the automatic frequency control a great time constant may be utilized with positive and small negative values of the control voltage, but a much smaller time constant with high negative values of the control voltage, so, that the negative control-grid bias of the control tube in the reception of a strong signal decreases sufficiently quickly on approaching the correct tuning.

The time constant may be varied either discontinuously, or continuously. A highly advantageous method of obtaining a discontinuous variation consists in that in series or in parallel with one or more of the elements of the smoothing filter there is arranged an auxiliary rectifier which has applied to it a fixed bias, together with at least a portion of the control voltage, in such manner that the auxiliary rectifier is either conductive, or cut off, according as the strength of the control voltage lies on the one or on the other side of a definite threshold value, so that the said elements are switched-off or short-circuited when the strength of the control voltage passes the threshold value.

Another suitable embodiment of the invention with discontinuous variation of time constant consists in that a relay is included in the circuit of a current-conveying electrode of a discharge tube controlled by the control voltage, said relay switching-over the smoothing filter if the strength of the control voltage exceeds a definite threshold value. The said discharge tube may, in addition, constitute one of the members to be controlled, so that the relay may be included, for example, in the anode circuit of a controlled signal-amplifying tube in the case of automatic volume control, or included in the anode circuit of the control tube in the case of automatic frequency control.

A circuit arrangement in which the time constant of the smoothing filter varies continuously may be obtained by constituting one of the elements of the smoothing filter by the impedance, dependent on mutual conductance, between two electrodes of a discharge tube controlled by the control voltage. In this discharge tube use is preferably made of feedback coupling having a reactive component, this is a feedback coupling, as a result of which a phase-displacement of about 90° occurs in the feedback circuit so that a capacity dependent on mutual conductance of the tube occurs between the electrodes in question. In this connection it may be observed that the input capacity of a discharge tube is in itself a function of the mutual conductance and, hence, on principle it always acts upon the time constant of a smoothing filter connected to the input electrodes; the natural variations in capacity are, however, of the order of magnitude of a few $\mu\mu$F, so that the said influence is very small. According to the invention, however, use is made of such a circuit that the time constant is influenced to an appreciable extent. The discharge tube utilizing the feedback coupling having a reactive component may, in addition, constitute one of the members to be controlled. Thus, for example, in the case of a control tube for automatic frequency control which controls the tuning of one or more oscillatory circuits by means of a high-frequency feedback coupling having a reactive component or by acting upon the magnetization of the iron cores of one or more inductance coils, use may simultaneously be made of a low-frequency feedback coupling having a reactive component which produces a variable capacity between control grid and cathode of the control tube, which capacity considerably influences the time constant of the smoothing filter.

The invention will be explained more fully by reference to the accompanying drawing showing, by way of examples, a few embodiments thereof.

Fig. 1 shows a smoothing filter which may be utilized in a circuit arrangement according to the invention and of which the time constant is small with small negative values of the control voltage and high with high negative values of the control voltage. As already explained hereinbefore, such a filter may advantageously be utilized in a receiver having automatic volume control.

The control voltage produced by a control rectifier (not shown) is supplied to the terminals 1 and 2, and this in such manner that terminal 1 acquires a negative potential with respect to terminal 2. Between the terminals 1 and 2 there is arranged the series-connection of a resistance 3, a condenser 4, an auxiliary rectifier (diode) 5 and a voltage source 6. A second resistance 7 is arranged in parallel with the series-connected resistance 3 and condenser 4. The control voltage to be supplied to the members to be controlled, for example to the control grid of a certain number of signal-amplifying tubes, is derived from the series-connection of condenser 4, auxiliary rectifier 5 and voltage source 6 with the aid of the terminals 8 and 9. The voltage source 6 brings the anode of auxiliary rectifier 5 at a negative potential while the cathode is given the potential of terminal 1 by means of resistance 7. Now, as long as the control voltage is smaller than the terminal voltage of the voltage source 6, the anode of the auxiliary rectifier will be negative with respect to, the cathode so that the auxiliary rectifier is cut off. Consequently, condenser 4 is switched-off so that the time constant of the smoothing filter is solely determined by the resistance 3 and the parasitic capacities of the circuit arrangement and, consequently, is very small. As soon as the control voltage exceeds the value of the terminal voltage of the voltage source 6, the auxiliary rectifier is rendered conductive so that condenser 4 is switched-in. The time constant of the filter is now determined by resistance 3 and condenser 4, so that it acquires a considerably higher value.

Fig. 2 shows a smoothing filter for use in a circuit arrangement according to the invention, of which the time constant is great with positive and small negative values but small with high negative values of the control voltage. As already explained hereinbefore, such a filter may advantageously be used in a receiver having automatic frequency control. The circuit arrangement shown in Fig. 2 only differs from that shown in Fig. 1 in that the anode and the cathode of auxiliary rectifier 5 are interchanged. Consequently, in the circuit shown in Fig. 2, the auxiliary rectifier 5 is conductive and hence the time constant is great as long as the control voltage is positive, or has a negative value lower than the terminal voltage of the voltage source 6. As soon as the control voltage attains a negative value higher than the terminal voltage of the voltage source 6, the auxiliary rectifier is cut off, the time constant thus being considerably reduced.

A highly advantageous form of construction of the circuit arrangement shown in Fig. 2 may be obtained by providing for the voltage source 6, which supplies the fixed bias for the auxiliary rectifier 5 not to be arranged in series with the auxiliary rectifier but, in series with a resistance, to be connected in parallel with the auxiliary rectifier. Thus, one obtains the advantage that the cathode of the auxiliary rectifier and the negative terminal of the voltage source can both be earthed so that the auxiliary rectifier may be combined in a simple manner with another tube, for example with a control-tube for automatic frequency control. A constructional example of such a circuit arrangement is shown in Fig. 3.

Fig. 3 shows a circuit arrangement for automatic frequency control, the auxiliary rectifier 5 being included in a triode 10 serving as a control tube for the control of the tuning of one or more oscillatory circuits. A resistance 11, in series with a voltage source (not shown) is connected in parallel with auxiliary rectifier 5, and this in such manner that the anode of the auxiliary rectifier is connected via resistance 11, to the positive terminal of the voltage source. The cathode of the triode 10 is connected to earth through a resistance 12 and connected to a point of positive potential through a resistance 13, due to which a suitable initial negative bias of the control grid of the triode is obtained. The anode circuit of the triode 10 includes a magnetising winding 14 which influences the magnetization of the core of an inductance coil 15 which, together with a condenser 16, constitutes an oscillatory circuit of which the tuning is corrected.

As regards the variation of the time constant of the smoothing filter, the operation of the circuit arrangement shown in Fig. 3 is substantially the same as that of the circuit shown in Fig. 2. It is necessary, however, to consider the circumstance that condenser 4 during the cut off period of the auxiliary rectifier is not switched-off completely since an additional charge of condenser 4 is still possible via resistance 11. Consequently, in order to obtain the desired effect, resistance 11 must be given a value which is higher than (and preferably high with respect to) the value of the parallel-connection of the resistances 3 and 7. Satisfactory results were already obtained in practice with a circuit arrangement in which each of the resistances 3, 7 and 11 had a value of 2 megohms; if necessary, resistance 11 may be given a still higher value.

Fig. 4 shows a circuit arrangement in which the time constant of the smoothing filter is varied with the aid of a relay. In this case a control voltage for automatic volume control, together with a signal voltage supplied to the terminals 17 and 18 and transferred inductively to an oscillatory circuit 19, is supplied to the control grid of a high-frequency amplifying tube 20. The anode circuit of this tube includes an oscillatory circuit 21 from which the amplified signal is derived inductively via the terminals 22 and 23. The energizing winding 25 of a relay is included in the cathode lead in series with a resistance 24 which serves to produce a suitable initial control-grid bias. Said relay controls a switch 26 which is arranged in series with the smoothing condenser 4, the construction being such that with small signal intensity (small control voltage and hence high direct anode current) the switch 26 is open so that the time constant of the smoothing filter is small, whereas with great signal intensity (high control voltage and hence small direct anode current) this switch is closed, a great time constant being obtained. Switch 26 is shunted by a condenser 27 which constitutes a short-circuit for the signal frequency but whose capacity is small with respect to that of condenser 4, so that the oscillatory circuit 19 is always earthed for high-frequency currents.

Fig. 5 shows a circuit arrangement in which the time constant of the smoothing filter is continuously variable. A control tube 10 for automatic frequency control, which exhibits a variable mutual conductance and whose output circuit is connected in a manner identical to that of the circuit shown in Fig. 3, in this case comprises a feedback coupling having a reactive component, resulting in a variable capacity between control grid and cathode. To this end, the anode circuit includes a high inductance constituted by the magnetizing winding 14 with which, if necessary, an additional coil 28 is connected in series. A resistance 29, in series with a blocking condenser 30, is interposed between the anode and the control grid. The inductance 14, 28 and the resistance 29 jointly constitute a phase-shifting network bringing about a phase-shift of approximately 90°. Consequently, between control grid and cathode there occurs a capacity dependent on mutual conductance, this capacity being greater according as the mutual conductance is greater. The inductance 14, 28 and the resistance 29 are proportioned in such manner that the capacity which occurs between control grid and cathode is at least of the same order of magnitude as the capacity of condenser 4 so that the time constant of the smoothing filter is highly dependent on mutual conductance, and this in such manner that the time constant is smallest with high negative values of the control voltage.

Fig. 6 shows a similar circuit arrangement in which the automatic frequency control is effected, however, by means of high-frequency feedback coupling having a reactive component. In this case a high-frequency choke coil 31 is arranged in series with the smoothing condenser 4 to prevent control grid and cathode from being short-circuited for high-frequency currents. The high-frequency feedback coupling is obtained by arranging a phase-shifting network constituted by a blocking condenser 32, a resistance 33 and a condenser 34 between the anode and the cathode of the control tube 10, a high-frequency alternating control-grid voltage which is dephased by approximately 90° with respect to the alternating anode voltage being derived from condenser 34. Consequently, between anode and cathode there occurs a capacity dependent on mutual conductance, which serves for the correction of tuning of the oscillatory circuit 15, 16.

A low-frequency feedback coupling having a reactive component is obtained by arranging between anode and control grid a high-frequency choke-coil 35 in series with a condenser 36 which, jointly with a resistance 37 included in the anode circuit, constitutes a phase-shifting network. Consequently, between control grid and cathode there occurs a variable capacity which appreciably influences the time constant of the smoothing filter, and this in the same manner as in the circuit shown in Fig. 5.

What we claim is:

1. In an automatic frequency control system for correcting by means of a rectified variable control voltage the frequency of an oscillator provided with a frequency-determining resonant circuit; frequency control apparatus comprising an electron discharge tube having a cathode, a grid and an anode, an input circuit to apply said control voltage between said grid and said cathode and including a resistance-capacitance filter incorporating the interelectrode grid-cathode capacitance of said tube, the resistance of said filter being connected to said grid in series with said control voltage and the capacitance of said filter comprising said grid-cathode capacitance and a capacitor connected between said grid and cathode, said capacitor having a value of capacitance which is no greater than approximately the value of said grid-cathode capacitance whereby the time constant of said filter is substantially dependent on the value of said grid-cathode capacitance, an output circuit coupling said anode to said frequency determining circuit to vary the frequency thereof as a function of said control voltage, and a phase-shifting network coupling said output circuit to said input circuit, said output circuit having a value of impedance which is relatively great so as to cause relatively large changes to occur in the value of said grid-cathode capacitance in accordance with changes in the value of mutual conductance of said tube and thereby vary the time constant of said filter as an inverse function of the magnitude of said control voltage.

2. Apparatus, as set forth in claim 1, wherein said network provides a substantially 90° phase shift.

3. In an automatic frequency control system for correcting by means of a rectified variable control voltage the frequency of an oscillator provided with a frequency determining resonant circuit including an inductor, frequency control apparatus comprising an electron discharge tube having a cathode, a grid and an anode, an input circuit to apply said control voltage between said grid and said cathode and including a resistance-capacitance filter incorporating the interelectrode grid-cathode capacitance of said tube, the resistance of said filter being connected to said grid in series with said control voltage and the capacitance of said filter comprising said grid-cathode capacitance and a capacitor connected between said grid and cathode, said capacitor having a value of capacitance which is no greater than approximately the value of said grid-cathode capacitance whereby the time constant of said filter is substantially dependent on the value of said grid-cathode capacitance an output circuit coupled to said anode and including a magnetizing coil, said coil being coupled to the inductor of said frequency determining circuit whereby the frequency thereof is varied as a function of said control voltage, and a phase shifting network coupling said output circuit to said input circuit, said output circuit having a value of impedance which is relatively great so as to cause relative large changes to occur in the value of said grid-cathode capacitance in accordance with changes in the value of mutual conductance of said tube and thereby vary the time constant of said filter as an inverse function of the magnitude of said control voltage.

4. In an automatic frequency control system for correcting by means of a rectified variable control voltage the frequency of a high frequency oscillator provided with a frequency determining parallel resonant circuit, frequency control apparatus comprising an electron discharge tube having a cathode, a grid and an anode, an input circuit to apply said control voltage between said grid and said cathode and including a resistance-capacitance filter incorporating the interelectrode grid-cathode capacitance of said tube, the resistance of said filter being connected to said grid in series with said control voltage and the capacitance of said filter comprising said grid-cathode capacitance and a capacitor connected between said grid and cathode, said capacitor having a value of capacitance which is no greater than approximately the value of said grid-cathode capacitance whereby the time constant of said filter is substantially dependent on the value of said grid-cathode capacitance an output circuit including means coupling said parallel resonant circuit between said anode and said cathode, means coupled between said output circuit and said input circuit to provide a phase shift at the frequency of said high frequency oscillations, whereby the internal anode-cathode capacitance of said tube and thereby the frequency of said parallel resonant network is varied as a function of said control voltage, and a phase shifting network coupling said output circuit to said input circuit, said output circuit having a value of impedance which is relatively great so as to cause relatively large changes to occur in the value of said grid-cathode capacitance in accordance with changes in the value of mutual conductance of said tube and thereby vary the time constant of said filter as an inverse function of the magnitude of said control voltage.

5. Apparatus, as set forth in claim 4, wherein said phase shift network is constituted by an inductance connected in series with a capacitor between said anode and said grid.

References Cited in the file of this patent

UNITED STATES PATENTS

| | | |
|---|---|---|
| 2,255,746 | Brailsford | Sept. 16, 1941 |
| 2,278,429 | Crosby | Apr. 7, 1942 |
| 2,315,043 | Boucke | Mar. 30, 1943 |
| 2,330,499 | Lehfeldt | Sept. 28, 1943 |
| 2,371,285 | Crosby | Mar. 13, 1945 |
| 2,382,436 | Marble | Aug. 14, 1945 |

FOREIGN PATENTS

| | | |
|---|---|---|
| 904,095 | France | Oct. 25, 1945 |